(12) United States Patent
Miyazawa et al.

(10) Patent No.: US 9,728,827 B2
(45) Date of Patent: Aug. 8, 2017

(54) BATTERY PACK

(71) Applicant: NISSAN MOTOR CO., LTD., Kanagawa (JP)

(72) Inventors: Atsushi Miyazawa, Kamakura (JP); Tomokatsu Himeno, Yokohama (JP); Keita Iritsuki, Yokohama (JP); Mori Nagayama, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 240 days.

(21) Appl. No.: 14/374,109

(22) PCT Filed: Jan. 21, 2013

(86) PCT No.: PCT/JP2013/051085
§ 371 (c)(1),
(2) Date: Jul. 23, 2014

(87) PCT Pub. No.: WO2013/111703
PCT Pub. Date: Aug. 1, 2013

(65) Prior Publication Data
US 2014/0370400 A1    Dec. 18, 2014

(30) Foreign Application Priority Data

Jan. 27, 2012  (JP) ................................ 2012-015355
Jan. 18, 2013  (JP) ................................ 2013-007486

(51) Int. Cl.
*H01M 12/08*  (2006.01)
*H01M 8/24*  (2016.01)
*H01M 4/86*  (2006.01)

(52) U.S. Cl.
CPC ......... *H01M 12/08* (2013.01); *H01M 4/8605* (2013.01); *H01M 4/8626* (2013.01);
(Continued)

(58) Field of Classification Search
CPC ............ H01M 12/08; H01M 2220/20; H01M 4/8605; H01M 4/8626; H01M 8/24; Y02E 60/50
See application file for complete search history.

(56) References Cited

U.S. PATENT DOCUMENTS 3,650,839 A   3/1972  Lang et al.
6,127,061 A  10/2000  Shun et al.
(Continued)

FOREIGN PATENT DOCUMENTS

EP    2408055 A1    1/2012
JP    S5998479 A    6/1984
(Continued)

*Primary Examiner* — Nicholas P D'Aniello
*Assistant Examiner* — Ling R Zeng
(74) *Attorney, Agent, or Firm* — Young Basile Hanlon & MacFarlane, P.C.

(57) ABSTRACT

Each air battery stacked in a battery pack includes a cathode layer, an anode layer, an electrolyte layer and a frame member having electrical insulation properties and surrounding at least outer circumferences of the electrolyte layer and the cathode layer. The cathode layer includes a fluid-tight air-permeable member located at a cathode surface thereof and having, when viewed in plan, an outer circumferential edge portion situated outside of the outer circumference of the electrolyte layer. The frame member includes a holding portion located a cathode side thereof so as to hold the outer circumferential edge portion of the fluid-tight air-permeable member. The outer circumferential edge portion of the fluid-tight air-permeable member is adapted as a compressed region to which a compressive load is applied in a thickness direction thereof. By this structure, it is possible to achieve both of thickness reduction and high electrolyte sealing performance.

10 Claims, 9 Drawing Sheets

(52) U.S. Cl.
CPC .......... *H01M 8/24* (2013.01); *H01M 2220/20* (2013.01); *Y02E 60/128* (2013.01)

(56) References Cited

U.S. PATENT DOCUMENTS

| | | |
|---|---|---|
| 8,659,268 B2 | 2/2014 | Krishnan et al. |
| 2005/0202291 A1* | 9/2005 | Schweizer ........ H01M 8/04186 429/434 |
| 2011/0316485 A1 | 12/2011 | Krishnan et al. |
| 2012/0021303 A1* | 1/2012 | Amendola .............. H01M 4/42 429/406 |
| 2012/0321968 A1 | 12/2012 | Sato et al. |
| 2014/0315106 A1 | 10/2014 | Miyazawa et al. |

FOREIGN PATENT DOCUMENTS

| | | |
|---|---|---|
| JP | H03-297074 A | 12/1991 |
| JP | 2009-093983 A | 4/2009 |
| JP | 2011-146339 A | 7/2011 |
| WO | 2013084625 A1 | 6/2013 |

* cited by examiner

BATTERY PACK

CROSS REFERENCE TO RELATED APPLICATIONS

The present application claims priority to Japanese Patent Application Nos. 2012-015355, filed Jan. 27, 2012 and 2013-007486, filed Jan. 18, 2013, each incorporated herein in its entirety.

TECHNICAL FIELD

The present invention relates to a battery pack using as a battery element an air battery in which oxygen serves as a cathode active material and, more particularly, to a battery pack having a plurality of air batteries stacked and connected in series together.

BACKGROUND

In recent years, researches and developments have been made on air batteries as drive power sources or auxiliary power sources for vehicles e.g. automotive vehicles. For use in a vehicle, it is necessary to assemble a battery pack by series connection of a plurality of air batteries in order to secure the output and capacity required for the vehicle. Further, it is important to reduce the thickness (size) of the air batteries due to the narrow limited installation space in the vehicle. As the distance from the electrolyte storage parts of the air batteries to the outside decreases with such thickness reduction, it is also very important to impart adequate electrolyte sealing performance to the air batteries.

There are conventionally known air batteries such as not only a so-called button-type air battery as disclosed in Japanese Laid-Open Patent Publication No. H03-297074 but also a chargeable/dischargeable secondary air battery as disclosed in Japanese Laid-Open Patent Publication No. 2009-093983. The air battery of Japanese Laid-Open Patent Publication No. 2009-093983 has a stacked structure in which a porous film, a net collector, a cathode, a separator with an electrolyte, a zinc anode and a collector are stacked together in order of mention from the upper side and placed in a space between an upper cap member with an air hole and a lower circular container member. In this type of air battery, an insulating sheet is disposed around the cathode, the separator and the zinc anode so that the cap member and the cathode-side collector are kept insulated from the circular container member and the anode-side collector by the insulating sheet.

The above conventional air battery however has the problem that, because of the stacked structure of the battery structural parts between the cap member and the circular container member, it is difficult to reduce the thickness of the air battery while securing the adequate electrolyte sealing performance for the air battery. It has been a challenge to provide any solution to such a problem.

SUMMARY

In view of the above-mentioned conventional circumstances, it is an object of the present invention to provide a battery pack using as a battery element an air battery capable of achieving both of thickness reduction and high electrolyte sealing performance.

According to one aspect of the present invention, there is provided a battery pack comprising a plurality of air batteries stacked together, wherein each of the air batteries comprising a cathode layer, an anode layer, an electrolyte layer interposed between the cathode layer and the anode layer and a frame member having electrical insulation properties and surrounding at least outer circumferences of the electrolyte layer and the cathode layer; wherein the cathode layer of each of the air batteries includes a fluid-tight air-permeable member located at a cathode surface thereof and having, when viewed in plan, an outer circumferential edge portion situated outside of the outer circumference of the electrolyte layer, wherein the frame member of each of the air batteries includes a holding portion located a cathode side thereof so as to hold the outer circumferential edge portion of the fluid-tight air-permeable member; and wherein the outer circumferential edge portion of the fluid-tight air-permeable member is adapted as a compressed region to which a compressive load is applied in a thickness direction thereof.

In the present invention, the above-structured air batteries are employed as batteries elements in the battery pack. It is possible for the air batteries to achieve both of thickness reduction and high electrolyte sealing performance. The battery pack can be readily constituted by stacking and connecting the air batteries in series to each other and very suitably used as a power source for a vehicle.

DESCRIPTION OF THE EMBODIMENTS

Hereinafter, a battery pack according to one embodiment of the present invention will be described below with reference to the drawings.

Figure 1:
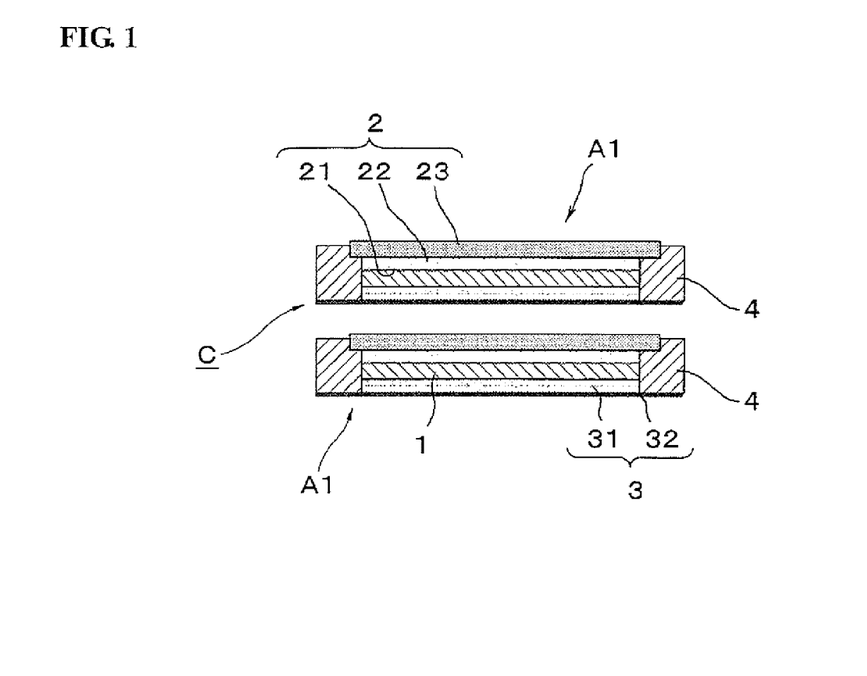
FIG. 1 is a cross-section view of a battery pack according to one embodiment of the present invention.

The battery pack C has a plurality of flat thin-type air batteries A1 stacked and connected in series together as battery elements (unit cells) as shown in FIG. 1. It is herein noted that, although two stacked air batteries A1 are spaced apart from each other in FIG. 1 for the purpose of avoiding complexity in illustration, these air batteries A1 are as a matter of course stacked together in direct contact with each other.

Figure 2A:
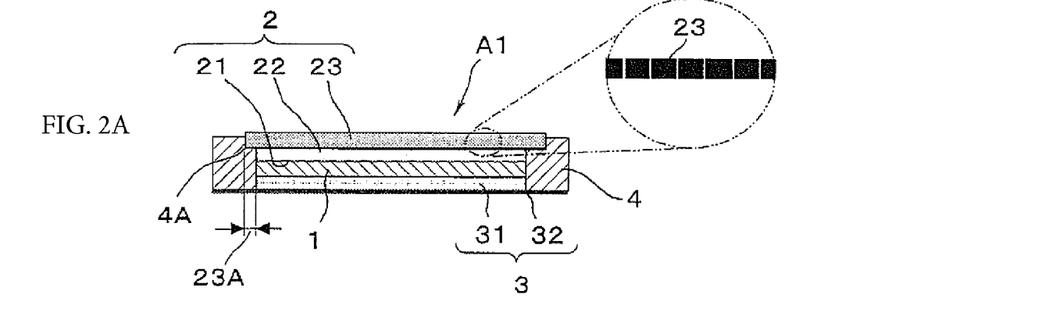
FIGS. 2(A) and 2(B) are a cross-section view and a plane view showing in detail an air battery used as a battery element in the battery pack of FIG. 1.
Figure 2B:
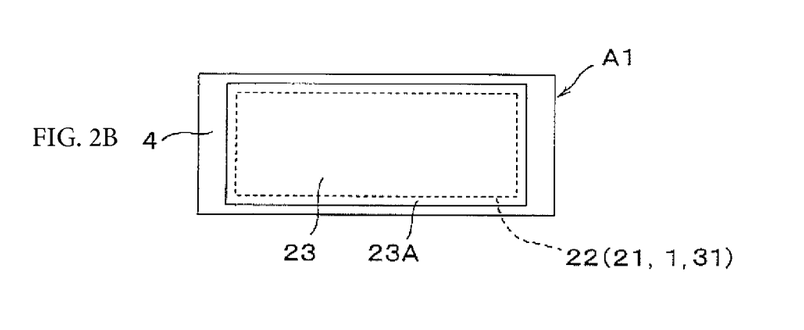

FIG. 2 shows each of the air batteries A1 in the battery pack of FIG. 1. The air battery A1 is rectangular plate-shaped and has a cathode layer 2 located on an upper side in the drawing, an anode layer 3 located on a lower side in the drawing, an electrolyte layer 1 interposed between the cathode layer 2 and the anode layer 3 and a frame member 4 surrounding at least outer circumferences of the cathode layer 2 and the electrolyte layer 1.

The cathode layer 2 includes not only a cathode collector 21 and a cathode member 22, but also a fluid-tight air-permeable member 23 stacked at a cathode surface thereof and having an outer circumferential edge portion situated outside of the outer circumference of the electrolyte layer 1 as shown in the plan view of FIG. 2(A). On the other hand, the anode layer 3 includes an anode member 31 and an anode collector 32 stacked at an anode surface thereof. Herein, the fluid-tight air-permeable member 23 has the feature of allowing a flow of gas such as air by its air permeability while blocking a flow of fluid by its fluid tightness or water tightness.

The frame member 4 has a holding portion 4A located on a cathode side thereof so as to hold the outer circumferential edge portion of the fluid-tight air-permeable member 23. In the present embodiment, the holding portion 4A is formed as a step with a height slightly smaller than a thickness of the fluid-tight air-permeable member 23 in a free state. The outer circumferential edge portion of the fluid-tight air-permeable member 23 is adapted as a compressed region 23A to which a compressive load is applied in a thickness direction thereof in a state where the air batteries A1 are stacked together as shown in FIG. 1. Thus, an upper surface of the fluid-tight air-permeable member 23 slightly protrudes from an upper surface of frame member 4 in a state of FIG. 2(B).

The electrolyte layer 1 is formed by impregnating a separator with an aqueous or non-aqueous solution (electrolytic solution) containing potassium hydroxide (KOH) or chloride as a main component. A plurality of fine pores is made in the separator at a predetermined ratio so as to store therein the aqueous or non-aqueous solution. Alternatively, the electrolyte layer 1 itself may be formed of a solid or gel electrolyte.

In the cathode layer 2, the cathode collector 21 functions to secure good electrical conductivity in an in-plane direction (i.e. a direction along a surface) of the cathode layer 2. The cathode collector 21 is made of an air-permeable conductive material such as stainless steel, copper (Cu), nickel (Ni) or carbon. The aperture rate of air permeation part of the cathode collector 21 can be set as appropriate depending on the conductivity of the cathode member 22. In the case of using a wire mesh as the cathode collector 21, for example, the aperture rate of the cathode collector 21 is equivalent to 50 to 600 mesh. There can alternatively be used an expand metal, a punching metal, a non-woven fabric of metal fibers or a carbon paper as the cathode collector 21.

The cathode member 22 is made of a conductive porous material containing a catalyst. For example, the cathode member 22 is in the form of a porous body prepared from a carbon material and a binder resin and carrying therein a catalyst such as manganese dioxide.

The fluid-tight air-permeable member 23 is a conductive member having fluid tightness (water tightness) against the electrolytic solution of the electrolyte layer 1 as well as air permeability for supply of oxygen to the cathode member 22. As specifically shown in the enlarged view of FIG. 2(A), a plurality of pores is made through the fluid-tight air-permeable member 23 in the thickness direction. In the case where conductivity is not required, there can alternatively be used a water-repellent film of fluoro resin such as Gore-Tex™ as the fluid-tight air-permeable member 23. In the case where conductivity is required as in the present embodiment, the fluid-tight air-permeable member 23 is made of a conductive porous material such as carbon paper.

In the anode layer 3, the anode member 31 is made of a pure metal such as lithium (Li), aluminum (Al), iron (Fe), zinc (Zn) or magnesium (Mg) or an alloy thereof.

The anode collector 32 is made of a conductive material capable of preventing leakage of the electrolytic solution from the electrolyte layer 1 to the outside. As such a material, there can be used stainless steel, copper (alloy) or a metal material having a surface coated with a plating of corrosion resistant metal.

The frame member 4 exhibits electrical insulation properties. In the present embodiment, the frame member 4 has a rectangular frame shape to surround not only the outer circumferences of the electrolyte layer 1 and the cathode layer 2 but also the outer circumference of the anode member 31 of the anode layer 3. The anode collector 32 of the anode layer 3 is thus formed into a rectangular shape equivalent to the frame member 4 so as to close an anode-side opening of the frame member 4.

Preferably, the frame member 4 is made of an electrolyte-resistant resin such as polypropylene (PP) or engineering plastic material. The use of such an electrolyte-resistant resin leads to weight reduction. As the material of the frame member 40, there can alternatively be used a fiber-reinforced plastic material (FRP) in which a resin is mixed with reinforcing fibers such as carbon fibers or glass fibers to ensure mechanical strength. It is however essential for the frame member 40 to exhibit electrical insulation properties as mentioned above in the present embodiment.

Although not shown in the drawings, the air battery A1 may have any means for forming a conduction path from the cathode collector 21 to the outside or a space for air supply to the cathode layer 2 in the stacked state of air batteries A1. Further, a separable sealing sheet may be applied to the surface of the cathode layer 2 to prevent discharge during unuse.

As mentioned above, each of the air batteries A1 has a basic structure in which the electrolyte layer 1 is sandwiched between the cathode layer 2 and the anode layer 3 and surrounded by the frame member 4. Thus, the air batteries A1 are very simple in structure and can be easily reduced in thickness.

As the anode structural parts are formed using metal materials, it is easy to secure electrolyte sealing performance on the anode side of the air battery. By contrast, it is likely that, by thickness reduction, leakage of the electrolytic solution will occur on the cathode side of the air battery as the cathode structural parts are formed using porous materials.

In view of this problem, each of the air batteries A1 is so structured that: the fluid-tight air-permeable member 23 of the cathode layer 2 is made larger in size than the electrolyte layer 1; and the outer circumferential edge portion of the fluid-tight air-permeable member 23 is adapted as the compressed region 23A and held by the holding portion 4A of the frame member 4. In the battery pack in which the air batteries A1 are stacked together and connected in series, the fluid-tight air-permeable member 23 of the lower-side air battery A1 is brought into contact with the anode collector 32 of the upper-side air battery A1 as shown in FIG. 1. As the fluid-tight air-permeable member 23 has conductivity, these upper- and lower-side air batteries A1 are electrically conducted to each other by contact of the fluid-tight air-permeable member 23 of the lower-side air battery A1 and the anode collector 32 of the upper-side air battery A1. At this time, the fluid-tight air-permeable member 23 of the lower-side air battery A1 is sandwiched between the frame member 4 of the lower-side air battery A1 and the anode collector 32 of the upper-side air battery A1 so that the outer circumferential compressed region 23A of the fluid-tight air-permeable member 23 undergoes compressive deformation under the application of a compressive load in the thickness direction. The fluid-tight air-permeable member 23, which is inherently resistant to electrolyte, functions as a sealing member so as to inhibit permeation of liquid and gas particularly through the outer circumferential edge portion, i.e., the compressed region 23A to which the compressive load is applied in the thickness direction, and assuredly prevent leakage of the electrolytic solution on the cathode side.

In this way, it is possible for the air battery A1 to achieve both of thickness reduction and high electrolyte sealing performance. It is also possible to readily constitute the battery pack C by serial connection of the air batteries A1 as shown in FIG. 1, so that the battery pack C can achieve size reduction and structural simplification and be very suitably used as a power source for a vehicle.

Figure 3:
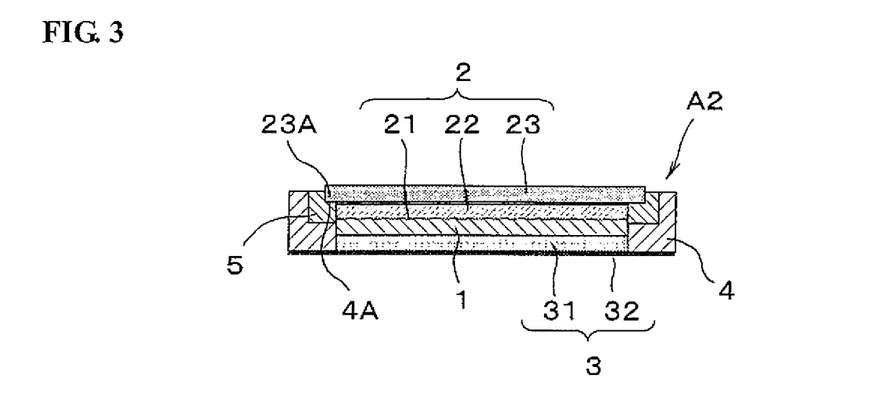
FIG. 3 is a cross-section view of an air battery usable in a battery pack according to another embodiment of the present invention.

FIG. 3 shows an air battery usable as a battery element in a battery pack according to another embodiment of the present invention. It is herein noted that, in the following embodiments, the same parts and portions as those of the above embodiment are designated by the same reference numerals to omit repeated explanations thereof.

In the air battery A2 of FIG. 3, the frame member 4 has a rectangular frame-shaped contact part 5 disposed in an inner circumferential side thereof. A holding portion 4A is formed in the contact part 5 as a step so as to hold thereon the outer circumferential compressed region 23A of the fluid-tight air-permeable member 23.

The contact part 5 has an inner end portion (lower end portion) brought into contact with an outer circumferential edge portion of the cathode collector 21 and an outer end portion (upper end portion) exposed at a surface of the frame member 4. The outer end portion of the contact part 5 is slightly lower in height than an upper surface of the fluid-tight air-permeable member 23 and is in flush with an upper surface of the frame member 4.

Further, the contact part 5 is made of a conductive metal material such as copper (Cu), stainless steel or nickel (Ni). There can alternatively be used any other metal material surface treated to secure electrolyte resistance. In order to reduce the contact resistance between the contact part 5 and the cathode collector 21, at least one of contact surfaces of the contact part 5 and the cathode collector 21 may be coated with a plating of gold (Au) or silver (Sg). As the conductive contact part 5 is provided in the air battery A2 as shown in FIG. 3, the fluid-tight air-permeable member 23 is not necessarily made of a conductive material.

It is thus possible for the air battery A2 to achieve both of thickness reduction and high electrolyte sealing performance as in the case of the above embodiment. Further, it is possible by the adoption of the frame member 4 with the contact part 5 to stack and connect the air batteries A2 in series and thereby constitute the battery pack in the same manner as in FIG. 1 with the use of the outer end portion of the contact part 5 as a cathode terminal and the anode collector 32 as an anode terminal. At this time, the fluid-tight air-permeable member 23 of the lower-side air battery A2 is sandwiched between the contact part 5 of the lower-side air battery A2 and the anode collector 32 of the upper-side air battery A2 so that the outer circumferential compressed region 23A of fluid-tight air-permeable member 23 undergoes compressive deformation under the application of a compressive load in the thickness direction. The fluid-tight air-permeable member 23, which is inherently resistant to electrolyte, functions as a sealing member so as to inhibit permeation of liquid and gas particularly through the outer circumferential edge portion, i.e., the compressed region 23A to which the compressive load is applied in the thickness direction, and assuredly prevent leakage of the electrolytic solution on the cathode side as in the case of the above embodiments.

Figure 4:
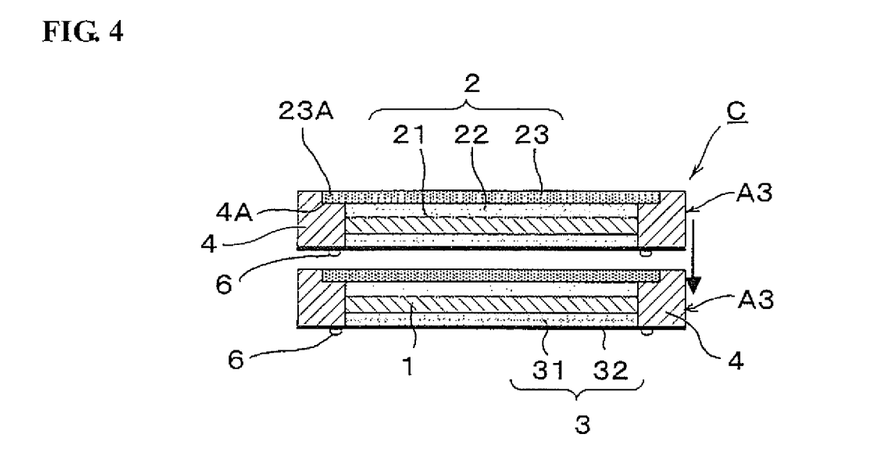
FIG. 4 is a cross-section view of a battery pack according to still another embodiment of the present invention.
Figure 5:
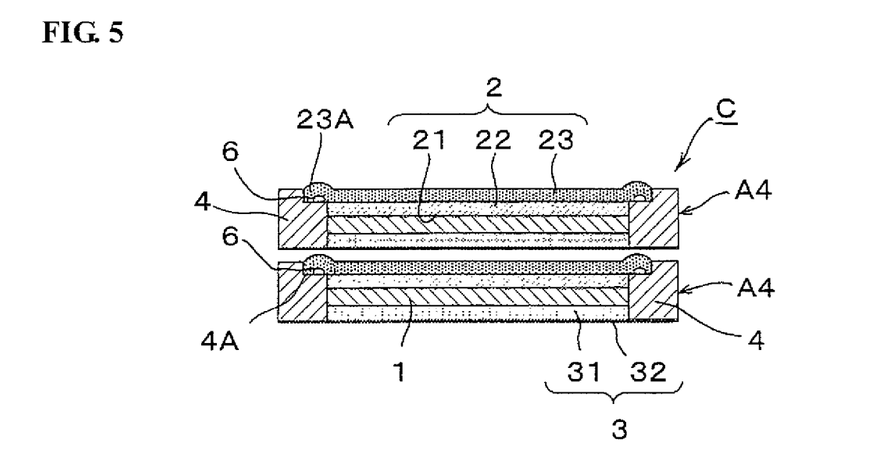
FIG. 5 is a cross-section view of a battery pack according to still another embodiment of the present invention.

FIGS. 4 and 5 show battery packs C with air batteries A3, A4 according to still another embodiments of the present invention. Each of the air batteries A3, A4 has a protrusion 6 formed on either the holding portion 4A of the frame member 4 or anode-side part of the air battery opposite the holding portion 4. More specifically, the protrusion 6 is formed on a portion of the anode collector 6 opposite the holding portion 4A in the air battery A3 of FIG. 4. In this embodiment, the upper surface of fluid-tight air-permeable member 23 is in flush with the upper surface of the frame member 4. In the air battery A4 of FIG. 5, on the other hand, the protrusion 6 is formed on the holding portion 4A of frame member 4. By the formation of such a protrusion 6, some part of the outer circumferential compressed region 23A of the fluid-tight air-permeable member 23 corresponding to the protrusion 6 bulges upward and protrudes from the upper surface of the frame member 4 in a free state of the air battery A4. It is herein noted that, although two stacked air batteries A3, A4 are spaced apart from each other in FIG. 4, 5 for the purpose of avoiding complexity in illustration, these air batteries A3, A4 are as a matter of course stacked together in direct contact with each other. Further, it is essential for the fluid-tight air-permeable member 23 to be made of a conductive material in the air battery A3 of FIG. 4 and the air battery A4 of FIG. 5 as in the case of the air battery A1 of FIGS. 1 and 2.

When the battery pack C is constituted by stacking of the air batteries A3 of FIG. 4, a compressive load is applied to the compressed region 23A of the fluid-tight air-permeable member 23 in the thickness direction between the holding portion 4A of the air battery A3 and the protrusion 6 of the anode-side part of the adjacent air battery A3. When the battery pack C is constituted by stacking of the air batteries A4 of FIG. 5, a compressed load is applied to the compressed region 23A of the fluid-tight air-permeable member 23 in the thickness direction between the protrusion 6 of the holding portion 4A of the air battery A4 and the anode surface of the adjacent air battery A4.

It is thus possible for the air battery A3, A4 to inhibit permeation of liquid and gas through the compressed region 23A of the fluid-tight air-permeable member 23, assuredly prevent leakage of the electrolytic solution on the cathode side and thereby achieve both of thickness reduction and high electrolyte sealing performance.

Figure 6:
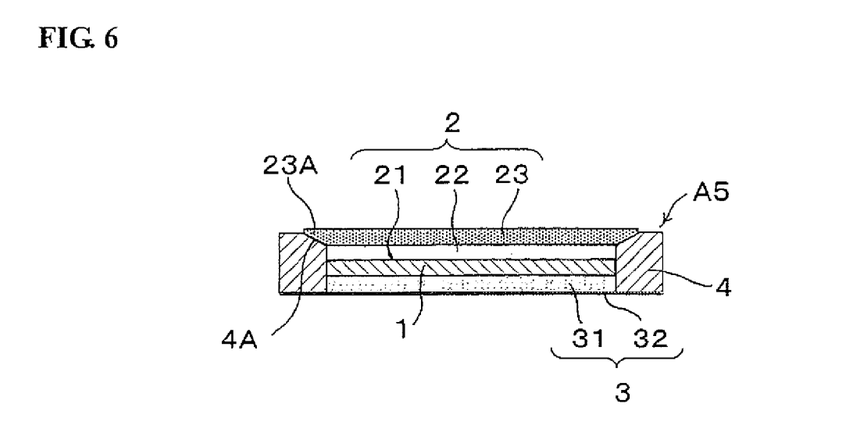
FIG. 6 is a cross-section view of an air battery usable in a battery pack according to still another embodiment of the present invention.

FIG. 6 shows an air battery usable as a battery element in a battery pack according to still another embodiment of the present invention. In the air battery A5 of FIG. 6, the frame member 4 has a holding portion 4A formed with a surface inclined downward toward the inside of the frame member 4. Further, a thickness of the fluid-tight air-permeable member 23 is made slightly larger than a height of the holding portion 4A in the air battery A5.

When the battery pack C is constituted by stacking of the air batteries A5 in the same manner as in FIG. 1, the fluid-tight air-permeable member 23 is compressed between the holding member 4A of the air battery A5 and the anode surface of the adjacent air battery A5 so that a compressive load is applied to the compressed region 23A of the fluid-tight air-permeable member 23 in the thickness direction. As the fluid-tight air-permeable member 23 of the cathode layer 2 is made of a conductive material, these upper- and lower-side air batteries A5 are electrically conducted to each other by contact of the fluid-tight air-permeable member 23 of the lower-side air battery A5 with the anode collector 32 of the upper-side air battery A5. At this time, the compression rate of the compressed region 23A can be changed in the in-plane direction for further improvement of sealing performance due to the formation of the inclined surface on the holding portion 4A.

Figure 7:
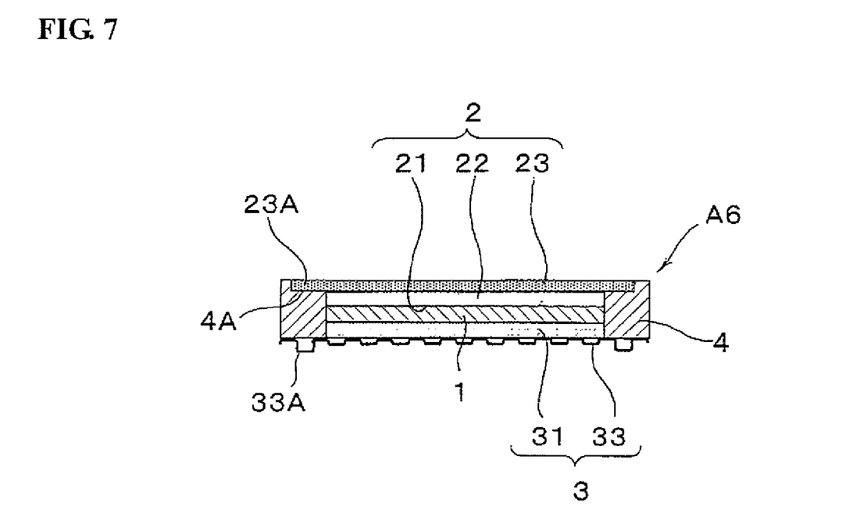
FIG. 7 is a cross-section view of an air battery usable in a battery pack according to still another embodiment of the present invention.
Figure 8:
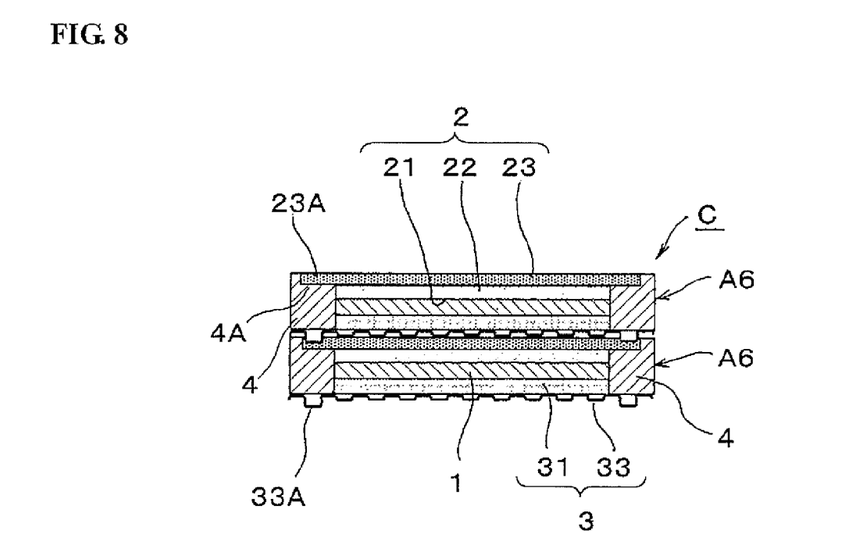
FIG. 8 is a cross-section view of the battery pack in which the air batteries of FIG. 7 are stacked as battery elements.

FIGS. 7 and 8 show a battery pack with air batteries A6 according to still another embodiment of the present invention. In the air battery A6 of FIGS. 7 and 8, the cathode layer 2 has a fluid-tight air-permeable member 23 made of a conductive material as in the case of the above embodiments; and the anode layer 3 has an anode collector 33 formed with a wavy cross section or a plurality of protrusions on an anode surface thereof. The material of the fluid-tight air permeable member 23 can be a porous material such as carbon paper. In this embodiment, an upper surface of the fluid-tight air-permeable member 23 is in flush with an upper surface of the frame member 4.

As shown in the drawings, the anode collector 33 is formed into a wavy cross-sectional shape by subjecting a flat material to corrugation process. In the case where the anode collector 33 is rectangular, the wavy shape is continued in either a long- or short-side direction of the anode collector 33. A protrusion 33a is formed on a portion of the anode collector 33 opposite the holding portion 4A of the frame member 4.

When the battery pack C is constituted by stacking of the air batteries A6 as shown in FIG. 8, these adjacent air batteries A6 are connected in series by contact of the conductive fluid-tight air-permeable member 23 of the air battery A6 with the anode collector 33 of the adjacent air battery A6. At this time, a compressive load is applied to the compressed region 23A of the fluid-tight air-permeable member 23 in the thickness direction between the holding portion 4A of the air battery A6 and the protrusion 33A of the anode collector 33 of the adjacent air battery A6. As the wavy cross-section anode collector 33 has open concave parts facing the adjacent (lower-side) air battery A6, there is formed an air flow path by such open concave parts between the adjacent air batteries A6.

It is thus possible for the air battery A6 to inhibit permeation of liquid and gas through the compressed region 23A of the fluid-tight air-permeable member 23, assuredly prevent leakage of the electrolytic solution on the cathode side and thereby achieve both of thickness reduction and high electrolyte sealing performance. Further, it is possible by the adoption of the wavy cross-section anode collector 33 to achieve good electrical connection between the adjacent air batteries A6, compression of the compressed region 23 for sealing performance and formation of the air flow path even with a very simple structure.

Although the anode collector 33 is formed into a wavy cross-sectional shape by corrugation process in this embodiment, the anode collector 33 may alternatively be formed with a plurality of appropriate protrusions along longitudinal and lateral directions. In such a case, the anode collector 33 is arranged such that the protrusions are directed toward the adjacent air battery A6 so as to secure the air flow path for this air battery A6.

Figure 9:
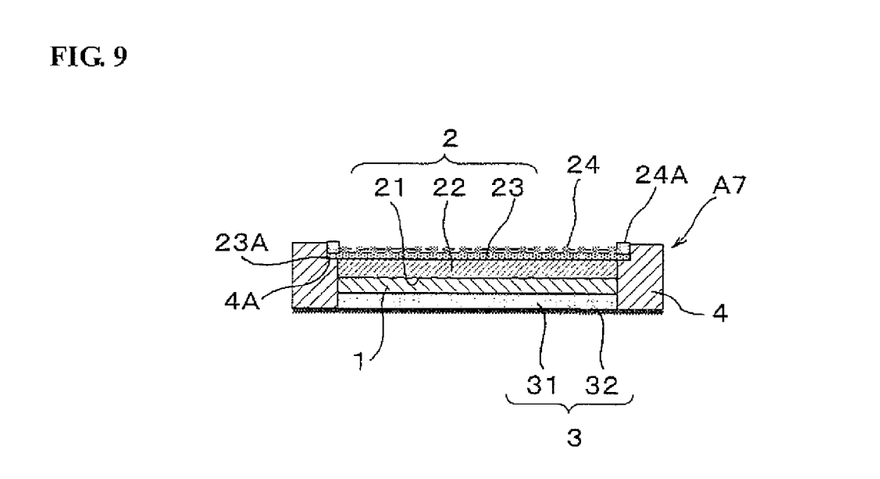
FIG. 9 is a cross-section view of an air battery usable in a battery pack according to still another embodiment of the present invention.

FIG. 9 shows an air battery usable as a battery element in a battery pack according to still another embodiment of the present invention. In the air battery A7 of FIG. 9, the fluid-tight air-permeable member 23 of the cathode layer 2 has a gas flow path forming part 24 disposed at a surface thereof so as to form a gas flow path. The gas flow path forming part 24 has a press portion 24A to apply a compressive load to the compressed region 23A of the fluid-tight air-permeable member 23. At least the press portion 24A of the gas flow path forming part 24 is made of a conductive material.

Figure 10A:
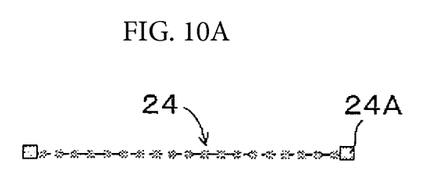
FIG. 10(A) is a cross-section view of a gas flow path forming part of the air battery of FIG. 9.
Figure 12A:
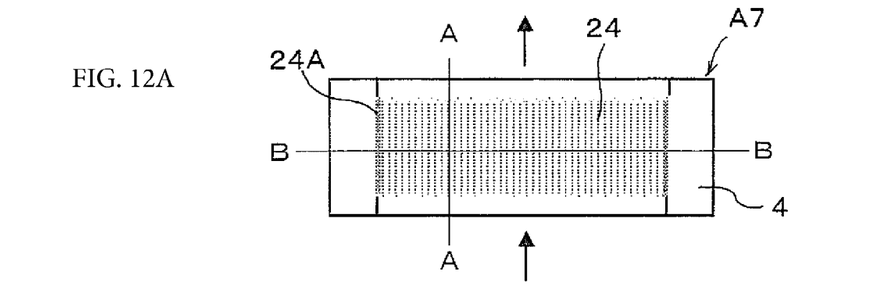
FIG. 12(A) is a plan view of the air battery of FIG. 9.
Figures 12B, 12C:
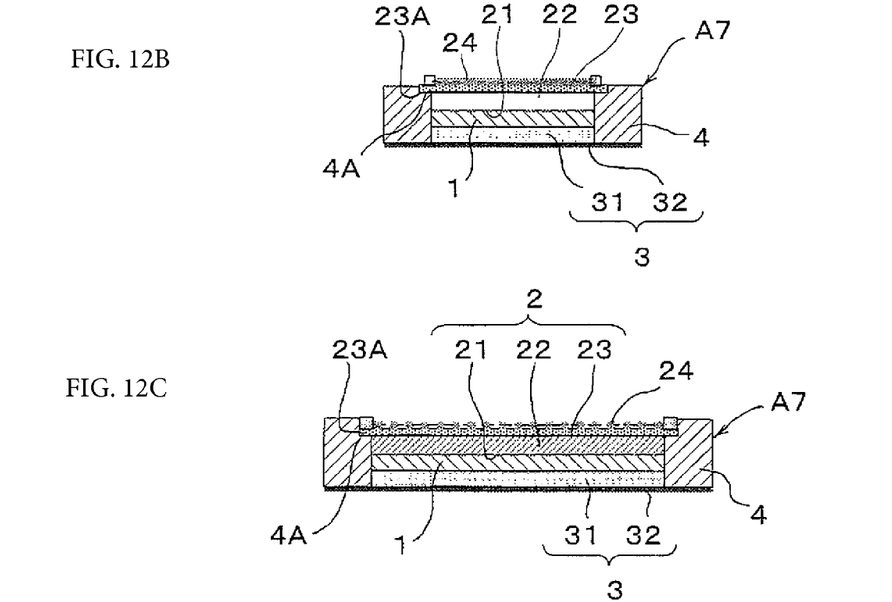
FIGS. 12(B) and 12(C) are cross-section views of the air battery taken along line A-A and line B-B of FIG. 12(A), respectively.

As shown in FIG. 10(A), the gas flow path forming part 24 can be in flat form such as punching metal or in three-dimensional form such as metal mesh, resin mesh or expand metal. In this embodiment, the gas flow path forming part 24 is adapted to allow a flow of gas (air) in a short-side direction as indicated by an arrow in FIG. 12(A). In FIGS. 12A-12C, center portions of longitudinal sides of the frame member 4 are made lower in height than both end portions of longitudinal sides of the frame member 4 so as to secure the air flow in the short-side direction as indicated by the arrow in FIG. 12(A).

Figure 10B:
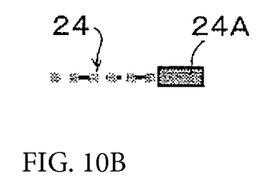
FIGS. 10(B) and 10(C) are cross-section views showing examples of a holding portion of the gas flow path forming part of the air battery of FIG. 9.
Figure 10C:
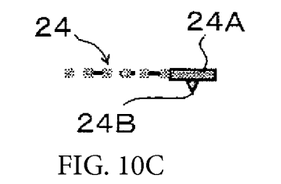

The press portion 24A is frame-shaped and disposed around an outer circumference of the gas flow path forming part 24. For example, the press portion 24A can be made larger in thickness than the body portion of the gas flow path forming part 24 as shown in FIG. 10(B) or can be formed with a protrusion 24B as shown in FIG. 10(C) for increase of compression amount.

Figure 11:
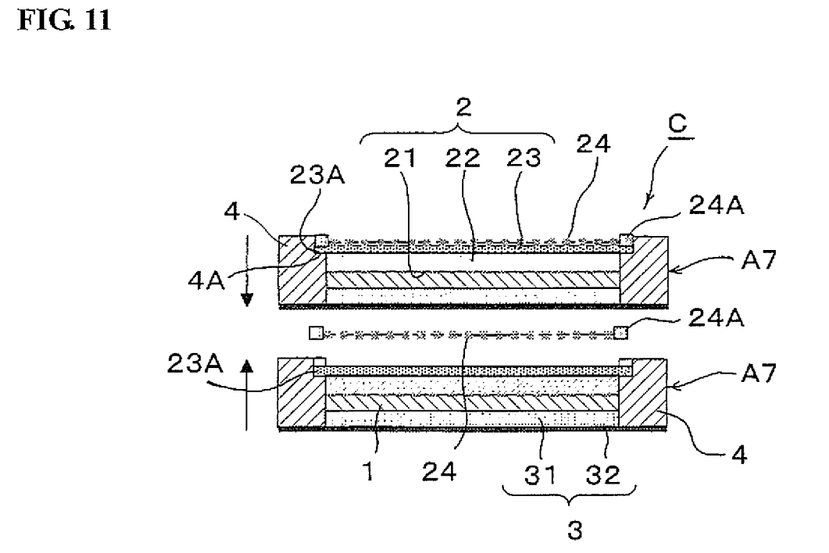
FIG. 11 is a cross-section view of the battery pack in which the air batteries of FIG. 9 are stacked as battery elements.

When the battery pack C is constituted by stacking of the air batteries A7 as shown in FIG. 11, the gas flow path forming part 24 is interposed between the adjacent air batteries A7 so as to not only apply a compressive load to the compressed region 23A of the fluid-tight air-permeable member 23 in the thickness direction between the press portion 24A of the gas flow path forming part 24 and the holding portion 4A of the frame member 4 but also secure the gas flow path for air flow by the gas flow path forming part 24.

As in the case of the above embodiments, it is possible for the air battery A7 to inhibit permeation of liquid and gas through the compressed region 23A of the fluid-tight air-permeable member 23, assuredly prevent leakage of the electrolytic solution on the cathode side and thereby achieve both of thickness reduction and high electrolyte sealing performance. It is further possible by the adoption of the gas flow path forming part 24 with the press portion 24A to compress the compressed region 23A for sealing performance and form the air flow path even with a very simple structure. In addition, the formation of the frame-shaped press portion 24A on the outer circumference of the gas flow path forming part 24 is advantageous for improvement of mechanical strength as well as compression of the compressed region 23A of the fluid-tight air-permeable member 23.

Figure 13A:
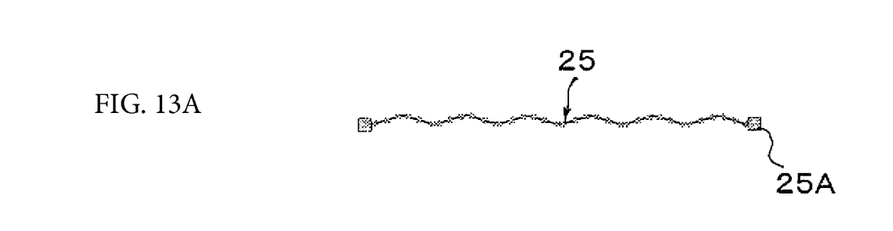
FIGS. 13(A) and 13(B) are cross-section views showing other examples of the gas flow path forming part.
Figure 13B:
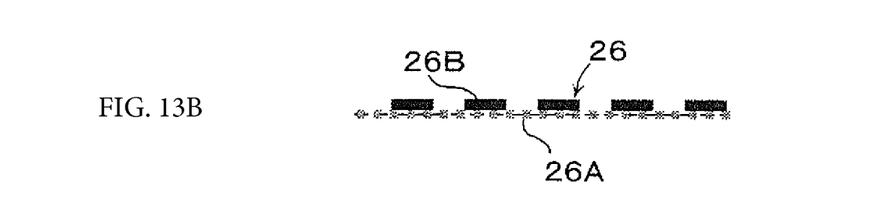

FIGS. 13A and 13B show other examples of the gas flow path forming part. In FIG. 13(A), the gas flow path forming part 25 is in the form of a punching metal or mesh material etc. with a wavy cross section or a plurality of protrusions and has a frame-shaped press portion 25A disposed around an outer circumference thereof. In FIG. 13(B), the gas flow path forming part 26 is formed by arranging a second component 26B of various shape such as spot shape or linear shape on a first component 26A of punching metal or mesh material etc. Even by the adoption of the gas flow path forming part 25 or 26, it is possible to compress the compressed region 23A for sealing performance and form the air flow path as in the case of the above embodiment.

Figure 14:
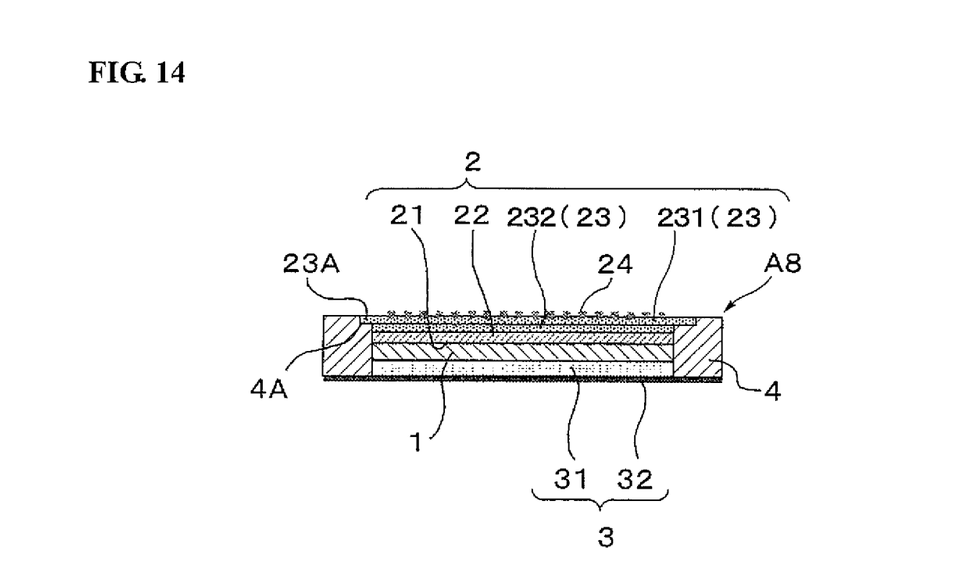
FIG. 14 is a cross-section view of an air battery usable in a battery pack according to still another embodiment of the present invention.

FIG. 14 shows an air battery A8 usable in a battery pack according to still another embodiment of the present invention. In the air battery A8, the fluid-tight air-permeable member 23 has conductivity and contains a catalyst. The amount of the catalyst contained in the outer circumferential compressed region 23A of the fluid-tight air-permeable member 23 is made smaller than the amount of the catalyst contained in the body portion of the fluid-tight air-permeable member 23.

In this embodiment, the fluid-tight air-permeable member 23 has a double-layer structure that consists of an outer layer 231 formed with the compressed region 23A and an inner layer 232 formed with no circumferential edge portion corresponding to the compressed region 23. In such a structure, the amount of the catalyst in the fluid-tight air-permeable member 23 can be adjusted in the thickness direction such that the amount of the catalyst in an outer part of the fluid-tight air-permeable member 23 is made smaller than the amount of the catalyst in an inner part of the fluid-tight air-permeable member 23. For example, it is feasible to contain a certain amount of catalyst in the inner layer 232 and to contain less or no catalyst in the outer layer 231.

It is possible for the air battery A8 to achieve both of thickness reduction and high electrolyte sealing performance as in the case of the above embodiments. It is also possible to allow one fluid-tight air-permeable member 23 to function as a catalyst layer and as a sealing member. In the case where the fluid-tight air-permeable member 23 has a double-layer structure of outer and inner layers 231 and 232, these outer and inner layers can function as a sealing member and a catalyst layer, respectively. This leads to easy formation of the fluid-tight air-permeable member 23 with these two functions.

Figure 15A:
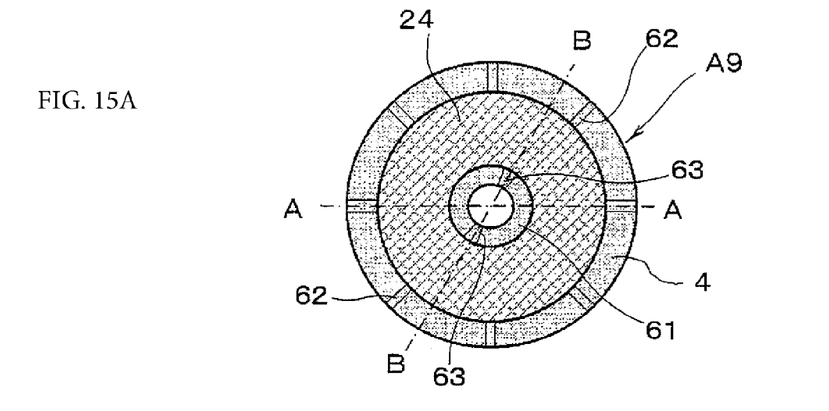
FIG. 15(A) is a plan view of an air battery usable in a battery pack according to still another embodiment of the present invention.
Figures 15B, 15C:
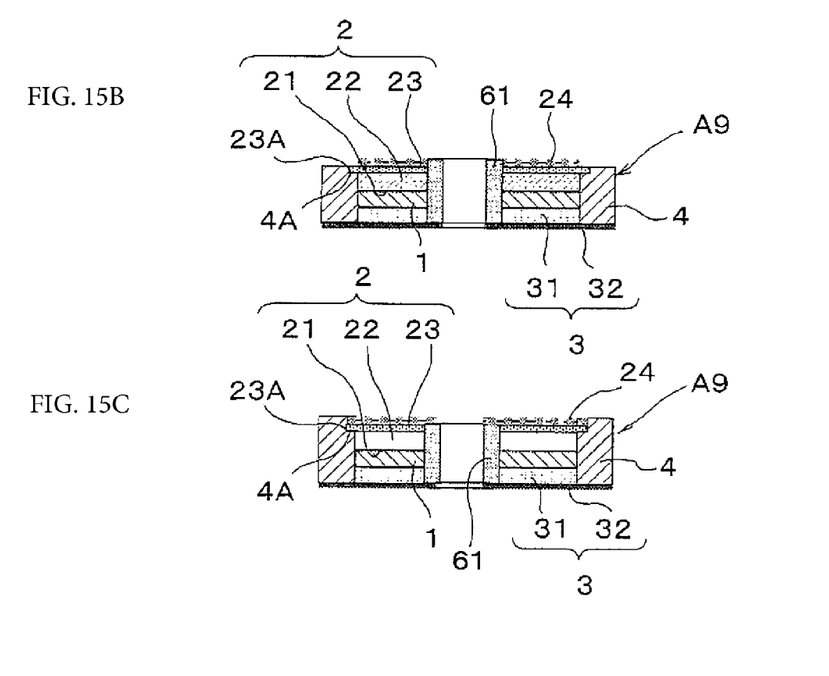
FIGS. 15(B) and 15(C) are cross-section views of the air battery taken along line A-A and line B-B of FIG. 15(A), respectively.

FIG. 15 shows an air battery A9 usable in a battery pack according to still another embodiment of the present invention. Although the basic structure of the air battery A9 is equivalent to that of FIG. 9, the air battery A9 is disc-shaped. More specifically, the air battery 9 has not only a cylindrical frame member 8 of relatively shallow depth but also an inner tube 61 such that the basic structure of the air battery A9 equivalent to that of FIG. 9 is placed in a space between the frame member 4 and the inner tube 61. A plurality of radial grooves 62 and 63 are formed in upper surfaces of frame member 4 and inner tube 61. When air batteries A9 are stacked together, these grooves 62 and 63 form an air flow path between upper- and lower-side air batteries A9. In the present invention, the air battery can be of various shapes such as rectangular shape or disc shape depending on the configuration of the counterpart to which the air battery provides a supply of power.

Figure 16A:
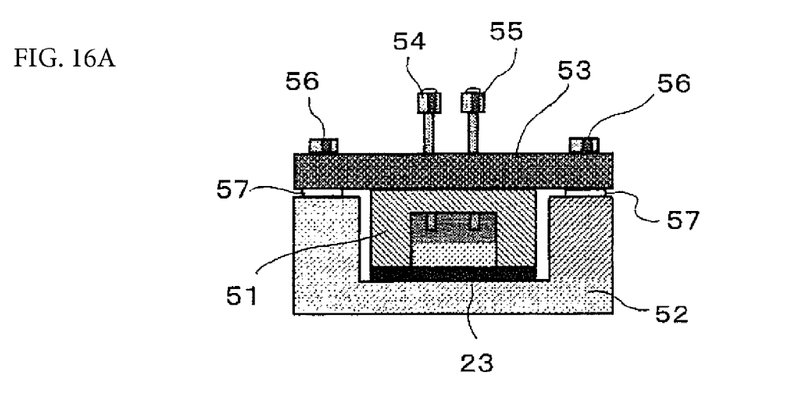
FIG. 16(A) is a cross-section view of a test machine used in an electrolyte leakage test.

An electrolyte leakage test was performed with the use of a test machine shown in FIG. 16(A). The test machine had an inner container 51 formed of stainless steel with a lower side open, an outer container 52 accommodating the inner container 51 and a press plate 53 adapted to press the inner container 51 against the outer container 52. An electrolytic solution feeding pipe 54 and a degassing pipe 55 were inserted through the press plate 53 and brought into communication with the inner container 51.

In the test, a compressive load was applied to the fluid-tight air-permeable member 23 by placing the fluid-tight air-permeable member 23 between an end surface of the inner container 51 and a bottom surface of the outer container 52 and fixing the press plate 53 to the outer container 52 with a plurality of bolts 56. At this time, a washer 57 was interposed between the press plate 53 and the outer container 52 such that there was a clearance left between the press plate 53 and the outer container 52.

Each of the surfaces of the containers 51 and 52 for contact with the fluid-tight air-permeable member 23 had a surface roughness of Ra<0.1 µm and Ry<10 µm. Herein, the parameters "Ra" and "Ry" represent a central mean surface roughness and a maximum height, respectively. The compressive load applied to the fluid-tight air-permeable member 23 was checked based on a tightening torque of the bolts 56 or with the use of a pressure-sensitive paper.

After feeding the electrolytic solution into the inner container 51, the test machine was allowed to sink in pure water (500 ml) within a vessel. The space between the containers 51 and 52 was filled with pure water. In this state, the test machine was left for 100 hours at 60° C. After that, the quantitative analysis of an electrolyte component in pure water was performed to determine the elution amount of the electrolyte component.

Figure 16B:
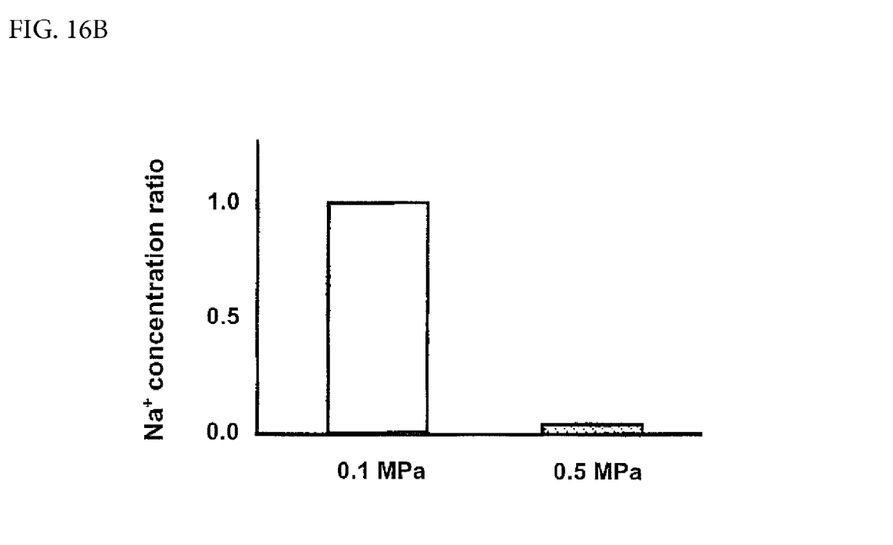
FIG. 16(B) is a graph showing a relationship between the rate of a leaked electrolyte component and the magnitude of a compressive load applied on a compressed region.

Assuming the concentration of the electrolyte component (Na) eluted under the application of a compressive load of 0.1 MPa as 1, the elution amount of the electrolyte component was significantly decreased when the compressive load applied was increased to 0.5 MPa as shown in FIG. 16(B). It has been confirmed by these results that it is possible in the present invention to obtain high sealing performance.

The battery pack according to the present invention is not limited to the above-mentioned embodiments. Various modifications and changes can be made to the above embodiments within the range that does not depart from the scope of the present invention.

The invention claimed is:

1. A battery pack comprising a plurality of air batteries stacked together, each of the plurality of air batteries comprising:
    a cathode layer, an anode layer, and an electrolyte layer interposed between the cathode layer and the anode layer, wherein the cathode layer includes a fluid-tight air-permeable member located at a cathode surface thereof and having, when viewed in plan, an outer circumferential edge portion situated outside of an outer circumference of the electrolyte layer, wherein the anode layer includes an anode collector; and a frame member having electrical insulation properties and surrounding at least outer circumferences of the electrolyte layer and the cathode layer, wherein the frame member includes a holding portion located on a cathode side thereof so as to hold the outer circumferential edge portion of the fluid-tight air-permeable member, wherein the fluid-tight air-permeable member is electrically conductive, wherein the holding portion of the frame member has a height slightly smaller than a thickness of the fluid-tight air-permeable member in a free state thereof so that, when the batteries are stacked, the outer circumferential edge portion of the fluid-tight air-permeable member is compressed in a thickness direction thereof and has one side held in direct contact with the holding portion of the frame member and the other side held in direct contact with the anode collector of the other adjacent battery so as to provide seal between the batteries.

2. The battery pack according to claim 1, wherein the each of the plurality of air batteries has a protrusion on either the holding portion of the frame member or anode-side part of the air battery opposite the holding portion of the frame member.

3. The battery pack according to claim 1, wherein the holding portion of the frame member has a surface inclined downward toward an inside of the frame member.

4. The battery pack according to claim 1, wherein the anode collector is formed with a wavy cross section or a plurality of protrusions on an anode surface of the anode layer; and wherein the anode collector has a protrusion formed on a portion thereof opposite the holding portion of the frame member.

5. The battery pack according to claim 1, wherein the fluid-tight air-permeable member includes a gas flow path forming part disposed at a surface thereof so as to form a gas flow path; and wherein the gas flow path forming part includes a press portion to apply the compressive load to the compressed region of the fluid-tight air-permeable member.

6. The battery pack according to claim 1, wherein the fluid-tight air-permeable member contains a catalyst; and wherein an amount of the catalyst in the outer circumferential edge portion of the fluid-tight air-permeable member is smaller than an amount of the catalyst in a body portion of the fluid-tight air-permeable member.

7. The battery pack according to claim 1, wherein the fluid-tight air-permeable member contains a catalyst; and wherein an amount of the catalyst in an outer part of the fluid-tight air-permeable member is smaller than an amount of the catalyst in an inner part of the fluid-tight air-permeable member with respect to a thickness direction.

8. The battery pack according to claim 1, wherein the cathode layer of one of the plurality of air batteries is in direct contact with the anode layer of another one of the plurality of air batteries adjacent to said one of the plurality of air batteries.

9. The battery pack according to claim 1, wherein the fluid-tight air-permeable member is formed of a conductive porous material.

10. The battery pack according to claim 1, wherein the fluid-tight air-permeable member is formed in one piece.

* * * * *